A. SHEPHERD.
SANITARY COOKING APPARATUS.
APPLICATION FILED FEB. 5, 1910.
965,955.
Patented Aug. 2, 1910.
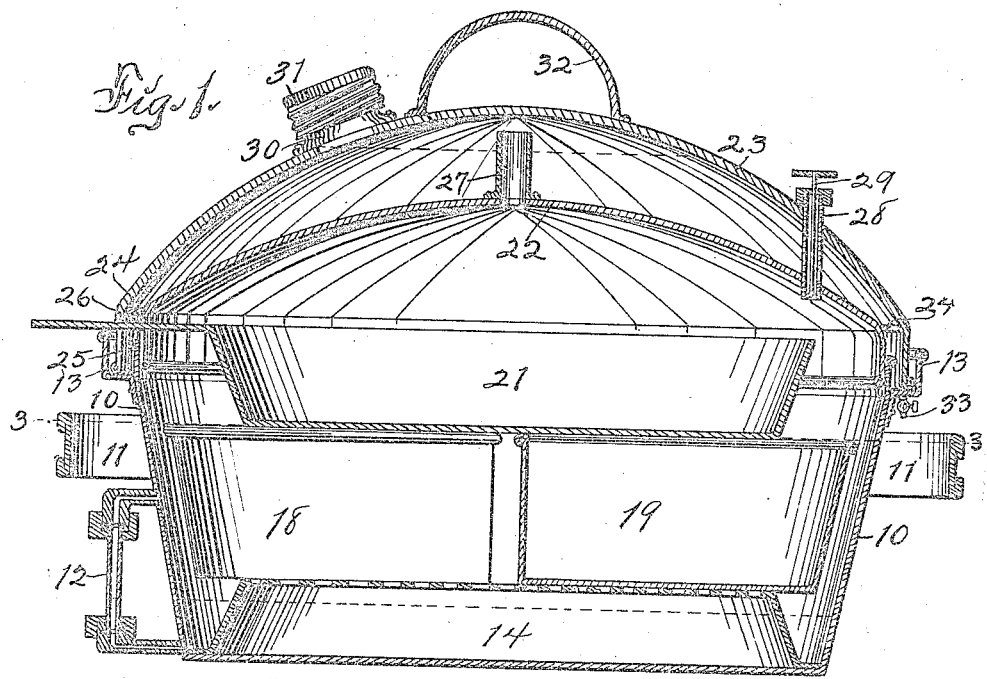
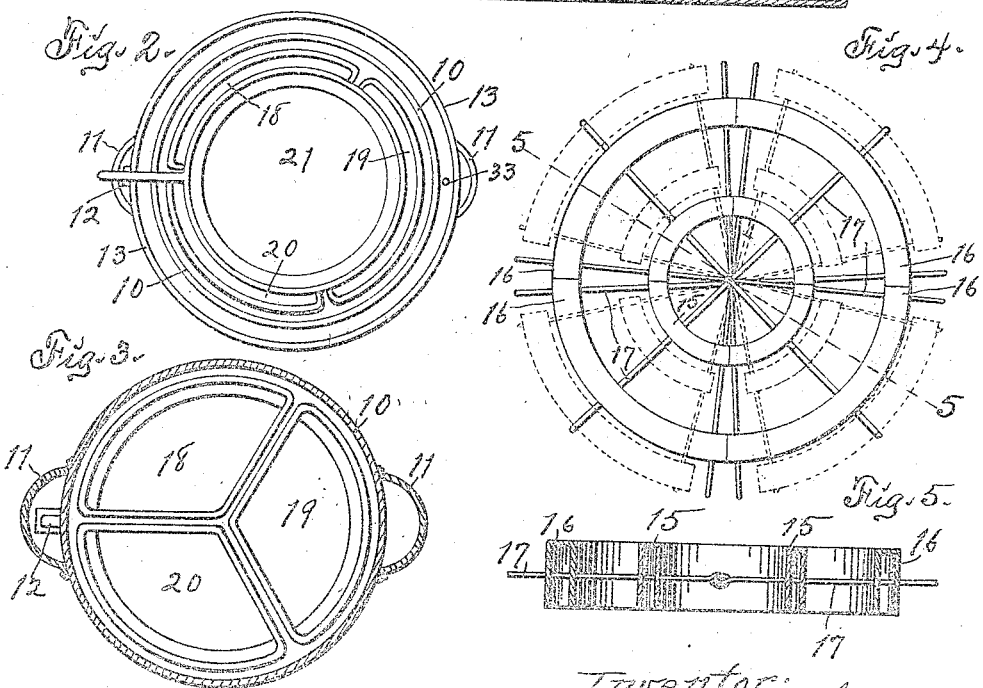

UNITED STATES PATENT OFFICE.

ARAADNA SHEPHERD, OF DES MOINES, IOWA.

SANITARY COOKING APPARATUS.

965,955.        Specification of Letters Patent.        Patented Aug. 2, 1910.

Application filed February 5, 1910. Serial No. 542,619.

*To all whom it may concern:*

Be it known that I, ARAADNA SHEPHERD, citizen of the United States, residing at Des Moines, in the county of Polk and State of Iowa, have invented a new and useful Sanitary Cooking Apparatus, of which the following is a specification.

The object of this invention is to provide an apparatus for culinary purposes, which is especially adapted for cooking different kinds of food simultaneously in the same inclosure.

A further object of this invention is to provide means for minimizing the escape of odor from cooking food.

A further object of this invention is to provide improved means for the steam-cooking of food.

A further object of this invention is to provide means for water-sealing together separable members of a domestic steamer.

A further object of this invention is to provide improved means for collocating and supporting different food containers in a single inclosure.

A further object of this invention is to provide a water dome for a domestic steamer.

A further object of this invention is to provide means for transferring water from a water dome to a cooking vessel of a domestic steamer.

My invention consists in the construction, arrangement and combination of elements hereinafter set forth, pointed out in my claims and illustrated by the accompanying drawing, in which—

Figure 1 is an elevation, partly in section, of my improved device. Fig. 2 is a plan of the same, the cover being removed. Fig. 3 is a horizontal section on the indicated line 3—3 of Fig. 1. Fig. 4 is a horizontal section on the indicated line 4—4 of Fig. 1, showing a modified form of a part of the device. Fig. 5 is a cross-section on the indicated line 5—5 of Fig. 4. Figs. 2, 3, 4 and 5 are on a smaller scale than Fig. 1.

In the construction of the device as shown the numeral 10 designates a cooking vessel or boiler, preferably made of sheet metal with a flat bottom, an annular flaring wall and an open top. The vessel 10 preferably is provided with diametrically arranged outwardly projecting handles 11, which handles preferably are made of sheet metal and rigid relative to the wall of the vessel. The vessel 10 preferably is provided with a water glass or gage 12 disposed vertically outside of and communicating at its ends through the wall of the vessel. The water glass or gage 12 has the usual function of indicating the depth of water in the cooking vessel or boiler 10. A gutter 13 is mounted on, surrounds and is arranged concentric with the upper marginal portion of the wall of the vessel 10. The gutter 13 preferably is made of sheet metal and is sealed to the outer surface of the wall of the vessel 10. The gutter 13 has its upper margin at greater altitude than the upper margin of the vessel 10 in order that any overflow from said gutter may discharge within said vessel instead of over the rim of the gutter. A trivet 14 is mounted in and rests on the bottom of the vessel 10. In one form the trivet 14 consists of an inverted sheet metal pan having a perforated bottom; and in another form said trivet consists of an annular metal ring 15, arc-shaped metal sections 16 and radial wires 17 extending through said ring and sections (Figs. 4 and 5).

In the construction as shown in Figs. 4 and 5 the arc-shaped sheet metal sections 16 may be adjusted radially relative to the ring 15, along the wires 17, to expand or contract the supporting surface of the trivet. Culinary vessels 18, 19, 20 are shown within the vessel 10 and supported by the trivet 14. These vessels 18, 19, 20 are shown as triangular in plan view and adapted to nestle compactly in the same horizontal plane. It is to be understood, however, that these vessels 18, 19, 20 may be substituted by any other vessel or vessels of suitable shape when desired and also may be provided with removable covers. The vessels 18, 19, 20 are adapted to contain food to be cooked and not only serve to contain said food but also hold it out of cooking water contained in the vessel 10. I also have illustrated a common skillet 21 within the vessel 10 and supported on the nestled vessels 18, 19, 20. The handle of the skillet 21 extends radially across the upper margin of the wall of the vessel 10. A lid or cover is provided for the vessel 10 and preferably is constructed as a water dome in the following manner: Superposed spherical segments 22, 23, made on different arcs, are arranged one within the other so that they bear concentric relations, and are connected at their margins by a flat ring 24. The marginal portions of the spherical segments 22, 23 are sealed to inner and outer margins respectively of the flat ring 24. The marginal portion of the spherical segment 22 extends within and concentric with the upper margin of the wall of the vessel 10 and the marginal portion of the spherical segment 23 extends within the gutter 13 and rests on the bottom thereof. The marginal portion of the spherical segment 23 is concentric with and outside of and spaced from the upper marginal portion of the wall of the vessel 10. Registering notches 25, 26 are formed in the marginal portions of the spherical segments 22, 23 beneath the flat ring 24 and provide space for the handle of the skillet 21. A vent flue 27 is mounted on and communicates with an aperture at the apex of the segment 22 and has its open upper end portion in close proximity to the inner surface of the apex of the segment 23. A valve chamber 28 is mounted through and connects the segments 22, 23 and communicates with the interior of the water dome between said segments. A needle valve 29 is mounted in the valve chamber 28 and controls the discharge of water therefrom. A threaded thimble 30 is mounted on and communicates with an aperture in the segment 23 and a cap 31 is adapted to be screwed on said thimble to close said aperture. A handle 32 is mounted on the segment 23 and spans the apex thereof. A pet-cock 33 is mounted on and communicates with an aperture in the bottom of the gutter 13.

In practical use the food to be cooked is placed in any desired vessel or receptacle which is then located in the vessel 10. Water is supplied to the vessel 10 to the desired level which is indicated as below the top of either vessel 18, 19, 20. Then the valve 29 is closed and water is supplied to the dome or cover through the thimble 30 to a depth not overflowing the flue 16. Then the thimble is closed by the cap 31 and the cover is placed in position as shown in Fig. 1. Then the vessel 10, with its contents and cover, is placed over a burner and the gutter 13 is supplied with water to serve as a seal for the lower margin of the spherical segment 23. Steam is generated by boiling of the water in the vessel 10 and serves to cook the contents of the containing receptacles therein. The water in the dome or cover also is heated and radiates downwardly in aid of the cooking process. Additional water may be discharged from the dome or cover to the interior of the cooking vessel by opening the valve 29. Water condensed on the lower surface of the spherical segment 22 will be discharged from the margin thereof within the vessel 10. Any superfluous water contained in and overflowing from the gutter 13 will be discharged within the vessel 10 over the upper margin of the wall thereof. When it is desired to empty the contents of the boiler or vessel 10, by tilting or inverting said vessel, it is preferable to first empty the gutter 13 through the pet-cock 35. This device may be employed to advantage as a dough raiser by removing the culinary articles shown and the trivet, placing a dough pan in the vessel 10 and charging the dome or cover with warm water.

The water seal provided by the gutter 13 is effective in retaining steam and odors within the apparatus save and except such as may escape through the registering notches 25, 26 and to this extent said notches serve as vents and safety ports for the apparatus.

I claim as my invention—

1. A cooking apparatus, comprising a boiler, a gutter mounted on, outside of and concentric with the upper margin of said boiler, a water dome mounted on said boiler, said water dome comprising superposed spherical segments sealed together near their margins, the margin of one segment extending within the wall of the boiler, the margin of the outer segment extending outside the wall of the boiler and within the gutter, and means for supplying water to said dome.

2. A cooking apparatus, comprising a boiler, a gutter mounted on, outside of and concentric with the upper margin of said boiler, a water dome mounted on said boiler, said water dome comprising superposed spherical segments sealed together near their margins, the margin of one segment extending within the wall of the boiler, the margin of the other segment extending outside the wall of the boiler, and within the gutter, means for supplying water to said dome, and valve controlled means for discharging water from said dome to said vessel.

ARAADNA SHEPHERD.

Witnesses:
S. C. SWEET,
EARL M. SINCLAIR.